United States Patent [19]

Newton

[11] Patent Number: 4,831,283

[45] Date of Patent: May 16, 1989

[54] TERMINATOR CURRENT DRIVER WITH SHORT-CIRCUIT PROTECTION

[75] Inventor: Stephen J. Newton, Ann Arbor, Mich.

[73] Assignee: BNR Inc., Mountain View, Calif.

[21] Appl. No.: 194,270

[22] Filed: May 16, 1988

[51] Int. Cl.$^4$ .............................................. H03K 17/16
[52] U.S. Cl. ................................... 307/443; 307/296.6; 307/270; 307/544; 307/549; 323/311; 361/92; 361/101
[58] Field of Search ................... 307/200 A, 443, 454, 307/475, 544, 549, 296 R, 297, 270; 323/311–312; 361/87, 92, 93, 101

[56] References Cited

U.S. PATENT DOCUMENTS

| | | | |
|---|---|---|---|
| 3,803,426 | 4/1974 | Conruyt et al. | 307/443 |
| 3,832,575 | 8/1974 | Dasgupta et al. | 307/443 |
| 4,027,177 | 5/1977 | Davis | 307/544 |
| 4,241,373 | 12/1980 | Mara et al. | 361/92 |
| 4,242,598 | 12/1980 | Johnson et al. | 307/297 X |
| 4,329,639 | 5/1982 | Davis | 307/297 X |
| 4,345,171 | 8/1982 | Harris, Jr. | 307/544 X |
| 4,398,106 | 8/1983 | Davidson et al. | 307/549 |
| 4,532,466 | 7/1985 | Polinski, Jr. | 307/297 X |
| 4,553,050 | 11/1985 | Feinberg et al. | 307/443 |
| 4,591,742 | 5/1986 | Morito | 307/475 |
| 4,626,889 | 12/1986 | Yamamoto et al. | 307/443 X |
| 4,675,551 | 6/1987 | Stevenson et al. | 307/443 |
| 4,723,191 | 2/1988 | Menniti | 361/92 |
| 4,766,334 | 8/1988 | Warner | 307/443 X |

FOREIGN PATENT DOCUMENTS

| | | | |
|---|---|---|---|
| 0161012 | 7/1979 | Netherlands | 307/443 |
| 1109506 | 4/1968 | United Kingdom | 307/443 |
| 2063025 | 5/1981 | United Kingdom | 307/443 |

OTHER PUBLICATIONS

Garth, "Interconnection of ECL Circuits for Maximum Gate Density", IEEE Int'l Conv. Conf. Digest, New York, USA, 23–26 Mar. 1970, pp. 256–257.
Ainscow, "Remote Termination of Transmission Lines", IBM T.D.B., vol. 13, No. 6, Nov. 1970, pp. 1614–1615.
Pollman et al, "Level Tracking Active Terminator", IBM T.D.B., vol. 23, No. 9, Feb. 1981, pp. 4189–4190.
Householder, Jr., "Schottky Barrier Diode Transmission Line Terminator", IBM T.D.B., vol. 19, No. 8, Jan. 1977, pp. 3133–3134.
Cases et al, "Multifunctional Diode Terminator Network", IBM T.D.B., vol. 21, No. 5, Oct. 1978, pp. 1881–1882.
Palmieri et al, "Nonlinear Termination Network for a Transmission Line Semiconductor Circuit", IBM T.D.B., vol. 12, No. 11, Apr. 1970, p. 1762.

Primary Examiner—David Hudspeth
Attorney, Agent, or Firm—Thomas R. Morrison

[57] ABSTRACT

A drive circuit for terminators in a SCSI (Small Computer Standard Interface) system comprises a bipolar transistor operating in saturated condition to keep the voltage drop to less than 200 millivolts. A second transistor serves to detect when, due to overcurrent conditions, the first transistor goes out off saturation and turns it off. Also provided is means for ensuring that the first transistor turns on before the second transistor on power-up.

5 Claims, 1 Drawing Sheet

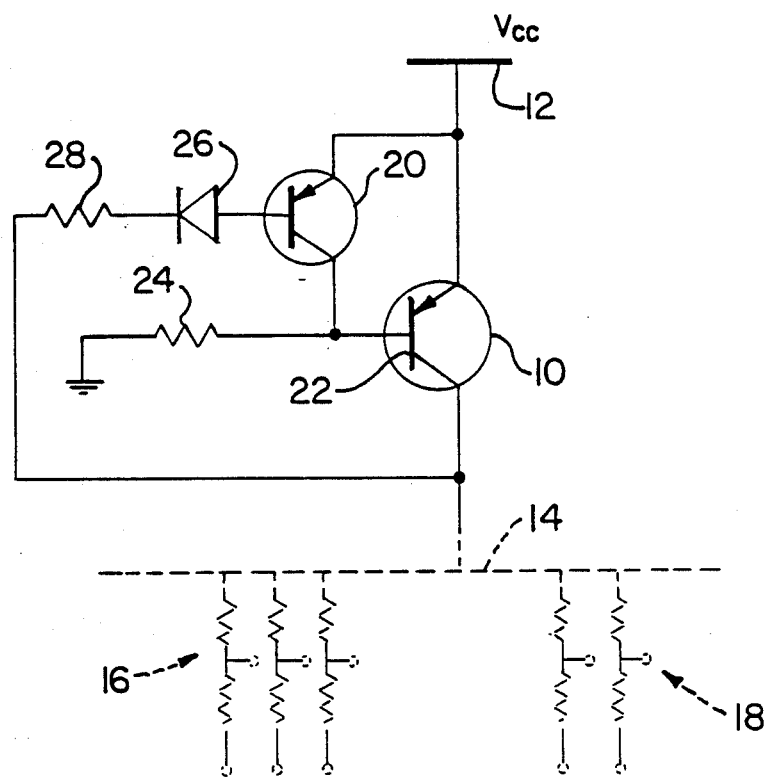

TERMINATOR CURRENT DRIVER WITH SHORT-CIRCUIT PROTECTION

The invention relates to current drivers for terminators in small computer systems. The invention is especially applicable to systems configured in accordance with American National Standard for Information Systems-Small Computer System Interface Specification X3T9.2/82-2.

BACKGROUND OF THE INVENTION

In existing such systems, the bus length is limited to 6.0 meters and the stubs have a maximum length of 0.1 meters. The terminators each comprise a resistance divider formed by a pair of resistors, conveniently 220 ohms and 330 ohms, respectively. Hence a voltage of 4.0 volts applied to the terminator will give a "high" voltage of 2.4 volts on the bus, giving a margin of 400 millivolts over a "high" level threshold of 2.0 volts.

Waves propagate along the bus at approximately 200 meters per microsecond, so it takes less than 1 nanosecond for an incident wave to transit a 0.1 meter stub. This stub-transit time is much less than the typcial wavefront rise-time of 8 nanoseconds minimum, so the 0.1 meter stub behaves like a capacitor and reflections are not a serious problem.

In some applications, however, stub lengths up to 0.5 meters are preferred. An example of such an application is the DV-1 TM system by Northern Telecom Limited employing several shared resource units. With 0.5 meter stubs, the transit time approaches the wavefront rise-time and reflections become a matter of concern. Experiments have shown that for high-to-low transitions the reflections die out quickly and the receiver input voltages remain below the "low" level threshold specified in the afore-mentioned specification. On the other hand, low-to-high transitions often produce reflections which drive the receiver input voltages below the "high" levels. This is more likely to occur, of course, when the terminator bias voltage is at its "worst case" low value.

It is desirable, therefore, to maintain the terminator bias voltage at near the supply voltage, usually 5.0 volts, thus providing a margin large enough to tolerate reflections without the receiver input voltage being driven beyond the threshold.

Known current drivers for SCSI (Small Computer Standard Interface) systems, comprise a plurality of silicon diodes each connected to a corresponding one of a plurality of 5.0 volts sources. The diodes are connected, each by a fuse, in common to the terminator's power terminal. This arrangement provides individual overcurrent protection and source isolation.

Such known arrangements are not entirely satisfactory since the voltage drop across the diodes leaves insufficient margin for reflections. For example, for an applied voltage $V_{CC}$ of 4.8 volts, and a typical voltage drop across the diode of 800 millivolts, the terminator voltage would be only 4.0 volts.

SUMMARY OF THE INVENTION

According to the present invention, a drive circuit for coupling a power source to at least one terminator in a small computer system, comprises:
 (i) a bipolar transistor, its emitter and collector for connection to said source and said terminator, respectively;
 (ii) a second transistor having its emitter and collector connected to, respectively, said emitter and said base of the first-mentioned transistor; and
 (iii) biasing means for biasing the first-mentioned transistor to saturation for current below a predetermined level and for causing the second transistor to conduct when the current through the first transistor exceeds said predetermined level, so turning off said first transistor.

In preferred embodiments, said biasing means comprises:
 (vi) a first impedance means connecting the base of said first transistor to ground, and
 (v) second impedance means connected between the base of said second transistor and said collector of said first transistor.

The drive circuit may further comprise means for ensuring that, on start up, said first transistor turns on before said second transistor. Such means for ensuring may conveniently comprise diode means connected in series with said second impedance means.

BRIEF DESCRIPTION OF THE DRAWING

An embodiment of the invention will now be described by way of example, with reference to the accompanying drawing, which shows a current driver, for connecting a power source to a small computer system, and terminators supplied thereby.

DESCRIPTION OF A PREFERRED EMBODIMENT

Referring to the drawing, a current driver comprises a bipolar transistor 10(2N 6190 or equivalent) with its emitter connected to a supply rail 12 which itself is connected to a power source supplying 5.0 volts d.c. The collector of transistor 10 is connected to a terminal 14 of a terminal array. The SCSI specification requires a terminator at each end of the bus. These are resistor groups 16 and 18, respectively. (shown broken.) A second bipolar transistor 20 (2N 3906 or equivalent) has its emitter connected to the supply rail 12 and its collector connected to the base 22 of the first-mentioned transistor 10. The base of transistor 10 and the collector of transistor 20 are connected by a resistor 24 to ground. A diode 26 (1N 4148 or equivalent) and a resistor 28, in series, connect the base of transistor 20 to the collector of transistor 10.

Bipolar transistor 10 has a $V_{CE}(sat)$ of about 100 millivolts at a collector current of about 600 milliamps. This small voltage drop keeps the terminator voltage within 200 millivolts of $V_{CC}$.

Resistor 24 sets the base current of transistor 10 so as to establish a maximum collector current based upon a worst case high beta. Transistor 20 monitors, in effect, the collector-emitter voltage of bipolar transistor 10. If an overcurrent condition, perhaps caused by a short on the bus, causes transistor 10 to go out of saturation, its collector-emitter voltage will increase until transistor 20 turns on. When transistor 20 turns on, it draws base current away from bipolar transistor 10 causing it to turn off. Bipolar transistor 10 remains off until the voltage $V_{CC}$ applied to its emitter is cycled. Diode 26 ensures that bipolar transistor 10 always turns on before transistor 20 on a normal power-up.

I claim:
 1. A drive circuit for coupling a power source to at least one terminator in a small computer system, comprising:

(i) a bipolar transistor, its emitter and collector for connection to said source and said terminator, respectively;

(ii) a second transistor having its emitter and collector connected to, respectively, said emitter and the base of the first-mentioned transistor; and (iii) biasing means for biasing the first-mentioned transistor to saturation for currents below a predetermined level and for causing the second transistor to conduct when the current through the first transistor exceeds said predetermined level, so turning off said first transistor.

2. A drive circuit as claimed in claim 1, wherein said biasing means comprises a first impedance means connecting the base of said first transistor to ground and a second impedance connected between the base of said second transistor and said collector of said first transistor.

3. A drive circuit as defined in claim 1, further comprising means for ensuring turn-on of said first transistor before said second transistor when the drive circuit is powered-up.

4. A drive circuit as defined in claim 3, wherein said means for ensuring comprises diode means connected between the base of said second transistor and the collector of said first transistor.

5. A drive circuit as defined in claim 2, further comprising diode means in series with said second impedance means, said diode means serving to ensure that said first transistor turns on before said second transistor on power-up.

* * * * *

UNITED STATES PATENT AND TRADEMARK OFFICE
CERTIFICATE OF CORRECTION

PATENT NO. : 4,831,283

DATED : May 16, 1989

INVENTOR(S) : Stephen J. Newton

It is certified that error appears in the above-identified patent and that said Letters Patent is hereby corrected as shown below:

On the title page, item [73] should read:

Northern Telecom Limited
      P.O. Box 6123, Montreal
      Quebec, Canada H3C 3J5

Signed and Sealed this

Fourth Day of June, 1991

*Attest:*

HARRY F. MANBECK, JR.

*Attesting Officer*    *Commissioner of Patents and Trademarks*